Aug. 4, 1942. H. HASENBURGER ET AL 2,292,121
PIPE SERVICE PIT AND ENCLOSURE
Filed Aug. 26, 1940 3 Sheets-Sheet 1
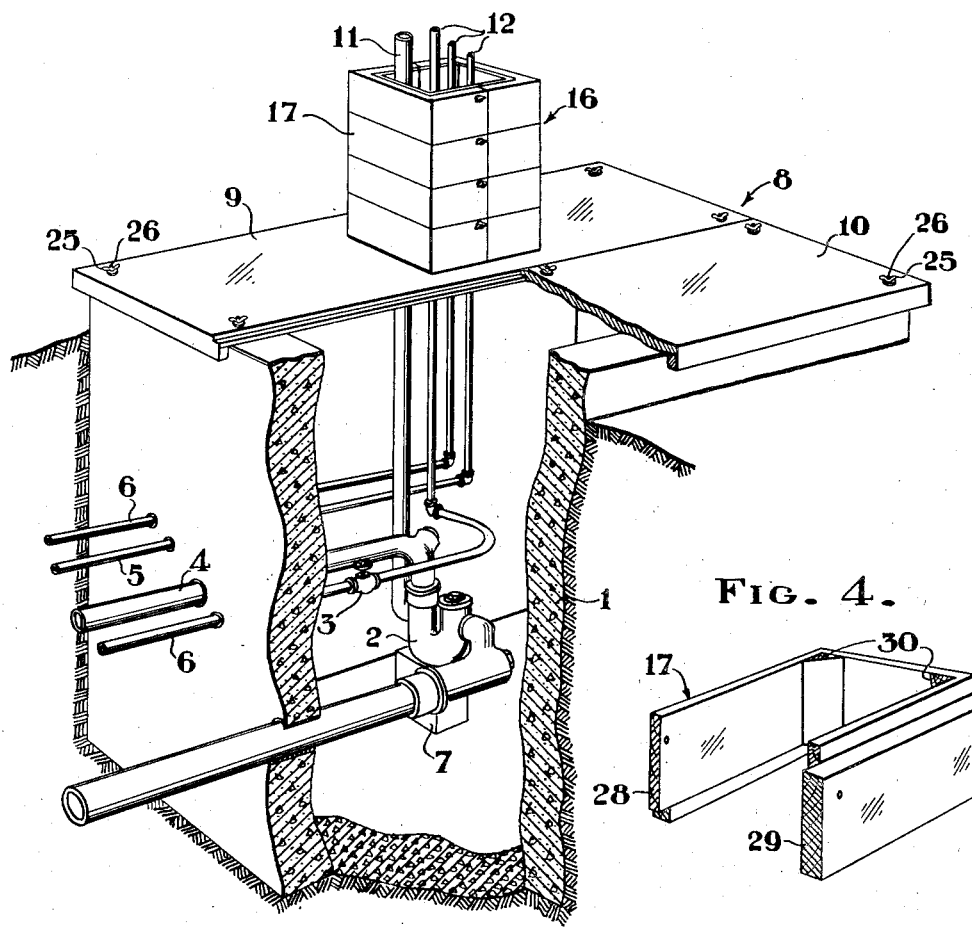
Inventors
HENRY HASENBURGER
HARVEY WILEY CORBETT
Attorney Aug. 4, 1942.   H. HASENBURGER ET AL   2,292,121
PIPE SERVICE PIT AND ENCLOSURE
Filed Aug. 26, 1940   3 Sheets-Sheet 2
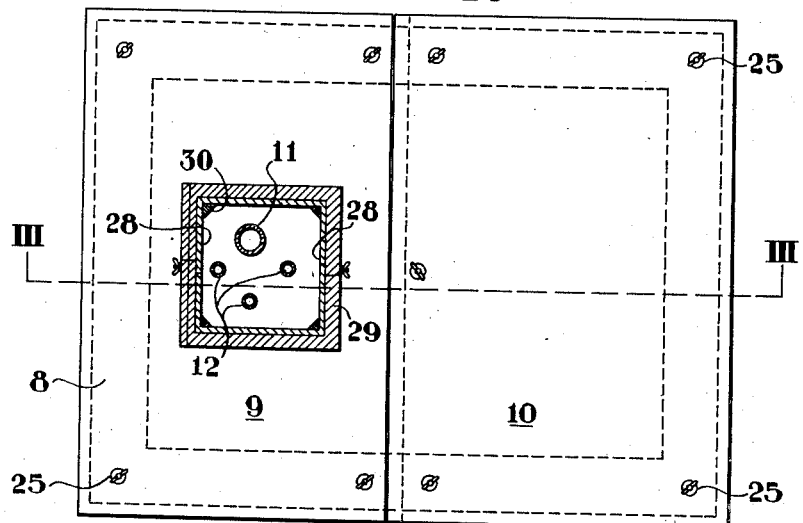
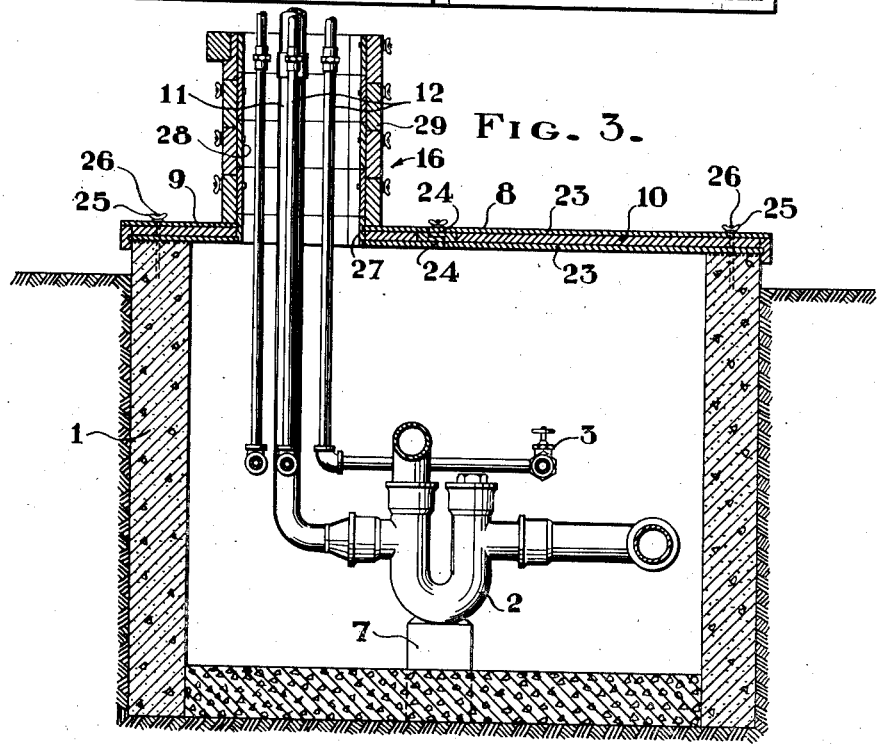
Inventors
HENRY HASENBURGER
HARVEY WILEY CORBETT
Attorney

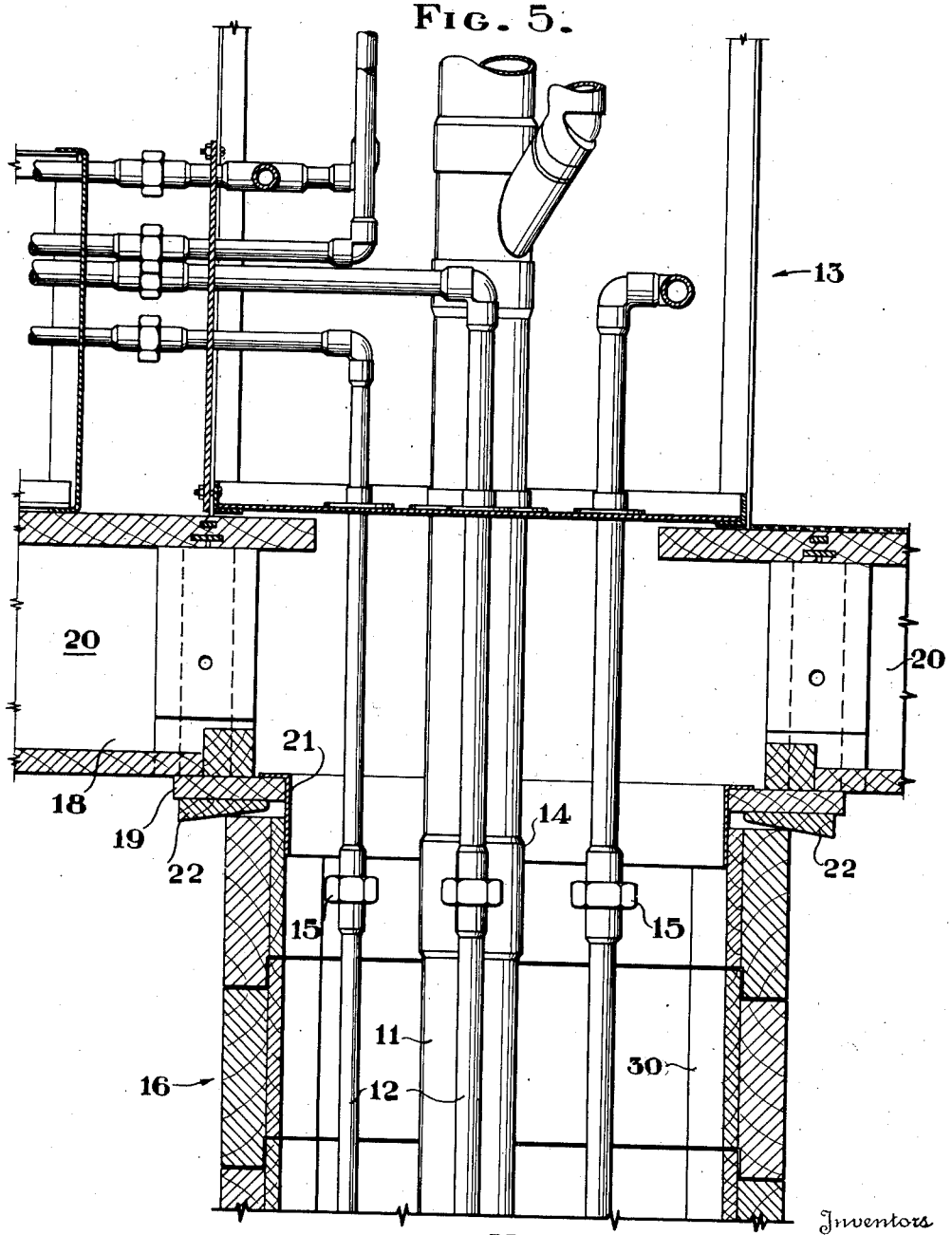

Patented Aug. 4, 1942

2,292,121

UNITED STATES PATENT OFFICE 2,292,121

PIPE SERVICE PIT AND ENCLOSURE

Henry Hasenburger, Newark, N. J., and Harvey Wiley Corbett, New York, N. Y., assignors to Prebilt Housing Corporation, New York, N. Y., a corporation of Ohio Application August 26, 1940, Serial No. 354,324

1 Claim. (Cl. 137—13)

This invention relates generally to building construction and is particularly directed to means for enclosing and protecting the exteriorly arranged pipes and fittings of the plumbing system employed in the building.

The primary object of this invention resides in the provision of casing means which can be readily installed at the building site and when the building is completed, will provide access to the pipes and fittings when service thereon is necessary. The casing means has been designed particularly for use with prefabricated buildings in which cabinet types of plumbing equipment shown in our copending applications, Serial Nos. 334,228 and 336,891 filed May 9, 1940, and May 23, 1940, respectively, are employed.

In these types of plumbing equipment, the pipes and fittings used in the system are grouped together to make compact units which can be fabricated in a factory and shipped to the building sites in assembled order where they may be readily installed without requiring any alterations or additions. When the casing means of the present invention is employed, it may be installed either beneath a building, which is ordinarily without a basement, or exteriorly thereof, depending upon the location of the plumbing equipment.

It is an object of the invention to provide a plastic casing in a recess in the soil adjacent to the building and position the exteriorly arranged pipes and fittings of the plumbing system within the casing, and securing an insulated cover to the open upper end thereof to prevent the entrance of dirt and atmosphere of subfreezing temperatures, the cover means having an insulated duct formed therewith to enclose and protect pipes leading from the fittings in the casing to the plumbing equipment in the building.

A further object resides in forming the casing of sufficient size to permit a workman to enter therein when cleaning or other servicing of the fittings and pipes becomes necessary, a part of the cover means being removable to provide access to the interior of the casing.

A still further object rests in providing a novel method of constructing the duct which encloses the pipes extending from the casing to the building, said duct being formed from a plurality of semi-rectangular frame-like sections arranged in opposed horizontal registration and stacked in vertical order, screw means being provided to maintain the sections in assembled relationship. By reason of this sectional construction, the duct can be assembled upon the casing cover after the pipes have been connected to complete the system.

Other objects will be made obvious from the following description and the accompanying drawings in which a plumbing equipment enclosure formed in accordance with the present invention has been illustrated in detail.

In the drawings:

Fig. 1 is a perspective view of an enclosure or service pit for plumbing equipment formed in accordance with the present invention, parts being broken away to show hidden structure;

Fig. 2 is a horizontal sectional view taken through the duct extending upwardly from the cover of the device and showing the cover in plan;

Fig. 3 is a vertical longitudinal sectional view taken through the enclosure or service pit on the plane indicated by the line III—III of Fig. 2;

Fig. 4 is a perspective view showing one of the frame-like sections from which the duct is formed, and Fig. 5 is a vertical sectional view taken through the upper end of the duct and the adjoining portions of the building to which the enclosure is applied, this view also showing in section, the lower portion of a plumbing cabinet unit to which pipe means extend from the enclosure.

Upon a closer reference to the drawings, it will be seen that the service pit or enclosure comprising the invention is partially embedded in the soil adjacent to a building in which a plumbing system is installed. The enclosure includes a casing 1 which is somewhat box-like in form and has open upper and lower ends, the casing being molded from plastic materials either in situ or remote therefrom after which it may be embedded in the desired location. As the casing is of considerable size and has relatively thick walls, it will be quite heavy and therefore it is essential to position the casing on solid ground. Otherwise, settling may take place and injury to the piping result.

After the casing has been located in the soil adjacent to the building plumbing fittings such as the trap 2, valve 3, waste, water and fuel supply pipes 4, 5 and 6, respectively, may be installed therein, suitable supporting means 7 being disposed in the lower end of the pit formed by the casing if found necessary. In the present instance, the upper and lower ends of the casing are open and a quantity of gravel, sand or ashes is disposed in the lower portion to permit water which might escape from the piping or otherwise find entrance, to drain from the casing. The service pipes leading from the street mains to the enclosure pass through one of the side walls of the casing and packing means are disposed between the pipe and casing wall to prevent the entrance of moisture, air or other foreign material at these places.

The open upper end of the casing is normally closed by a cover 8 which in the present showing is formed of two sections 9 and 10, the former being more or less permanently secured to the casing while the latter is removably disposed thereon. An opening is provided in the permanently secured cover section to accommodate pipes 11 and 12 leading from the fittings within the casing 1 to the plumbing unit 13 mounted on the first floor of the building. The pipes 11 and 12 constitute continuations of the pipes 4, 5 and 6 and to facilitate the connection of the pipes of the plumbing unit therewith, couplings 14 and 15 are incorporated therein. After the pipes 11 and 12 have been installed, a protective covering 16 is formed therefor by assembling U-shaped sections 17 into the duct which as shown in Figs. 1 and 3, surrounds the pipes and extends from the cover 8 upwardly to a position in close proximity to the under structure 18 of the buildings.

In Fig. 5, the building has been illustrated as having a panel 19 secured to the under structure 18 to assist in supporting insulating material in engagement with the lower edges of the first floor joists 20. The panel 19 also supports a metallic collar 21, the lower end of which is received within the upper end of the duct 16. Air at atmospheric pressures and temperatures is prevented from entering the duct by closing the space between the upper end and the building substructure with wedge strips 22 formed from insulating material and driven into place after the duct has been assembled.

To protect the pipes from freezing temperatures, the cover 8 and the duct 16 are constructed of material which offers resistance to the passage of heat and cold. The sections of the cover 8 are each formed from superposed layers 23 of compostion material or plywood between which a layer of insulating material is positioned. The under sides of the sections have depending frame strips secured along three edges, which strips extend downwardly around the upper edge of the casing and assist in positioning the cover thereon. The fourth edge of each section has a tongue 24 formed thereon to produce an overlapped joint when the sections are assembled into cover forming order where they will be maintained by wing nuts 25 removably threaded onto studs 26 embedded in the plastic material of the casing. To seal the joints between the sections and the casing, sheet felt is employed, this material being glued or otherwise secured to the cover sections at the time of manufacture.

Strips 27 of plywood or composition material line the opening in the stationary cover section and project a slight distance above the upper surface to form a flange by means of which the duct is located with respect to the cover.

The sections 17 from which the duct is formed are constructed of inner and outer layers 28 and 29 joined to form substantially U-shaped, frame-like members braced between the side legs and the cross bar by prismatic blocks 30. The layers 28 and 29 are of equal width but are joined in offset relationship to produce inner and outer flanges on the sections 17. Similar flanges are also formed at the outer ends of the side legs of the sections so that by placing two sections in opposed relation with outer ends of the side legs in abutting relationship, the flanges will overlap and securing elements may be extended therethrough to fasten the sections together in the form of a rectangular frame. When such frames are arranged in superposed relationship upon the cover 8, the flange around the opening in the cover section 9 and the flanges at the upper edges of each section will be overlapped by the depending flanges on the sections immediately thereabove. Due to this interfitting of the sections and the provision of the wedge members 22, the duct is maintained in assembled order. By making the duct from U-shaped sections, it can be built up after the pipes 11 and 12 have been installed.

When the enclosure is used in connection with a building in which the plumbing fixtures are arranged in the center of the building, a trap door may be provided in the floor to give access to the enclosure. If a need for service develops in the piping beneath the building, the cover section 10 may be removed after taking the wing nuts off the studs and access to the pit secured.

From the foregoing it will be apparent that a means for enclosing and protecting the exteriorly disposed pipe and fittings of a building plumbing system has been developed which may be readily installed, will perform its intended function without danger of failure and lends itself to factory production methods. The parts may be constructed in a factory in large quantities, shipped in separated order and assembled at the place of use without requiring any alterations or the services of skilled labor. Through the use of the article and the method of assembly set forth above, considerable savings in the erection and maintenance of a building can be effected.

While the parts and the relative positions thereof may be varied to a considerable extent from the single form shown in the drawings, such changes are believed to be obvious and all rights thereto which may be embraced within the scope of the following claim are hereby reserved.

What is claimed is

Enclosure means for plumbing equipment of a building comprising a plastic-lined pit having an open top and formed for the reception of pipes and fittings of the building plumbing system, a cover for the open top of said pit, said cover having a plurality of separable sections, one of which is provided with an opening through which conduits extend from the pit to the building, duct means carried by said cover for enclosing said conduits, said duct means being formed of a plurality of vertically and horizontally separable sections, wedge-shaped inserts of insulating material removably positioned between the upper end of said duct means and an under surface of said building, and a collar extending from the building into the upper end of said duct.

HENRY HASENBURGER.
HARVEY WILEY CORBETT.